June 2, 1931.  W. FISHER  1,808,161
PROCESS FOR MAKING MOLDING SAND
Filed Aug. 24, 1927  7 Sheets-Sheet 1
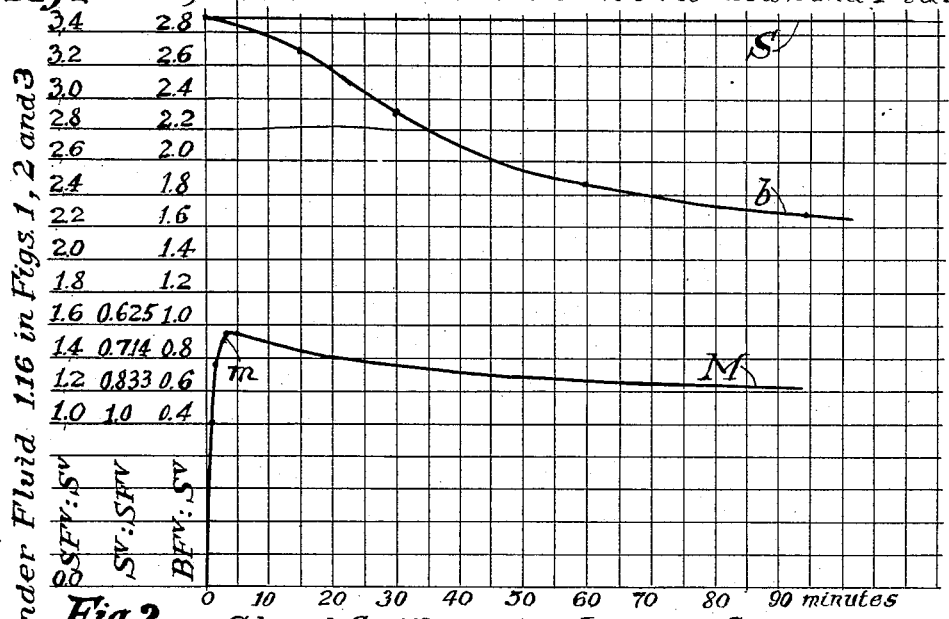
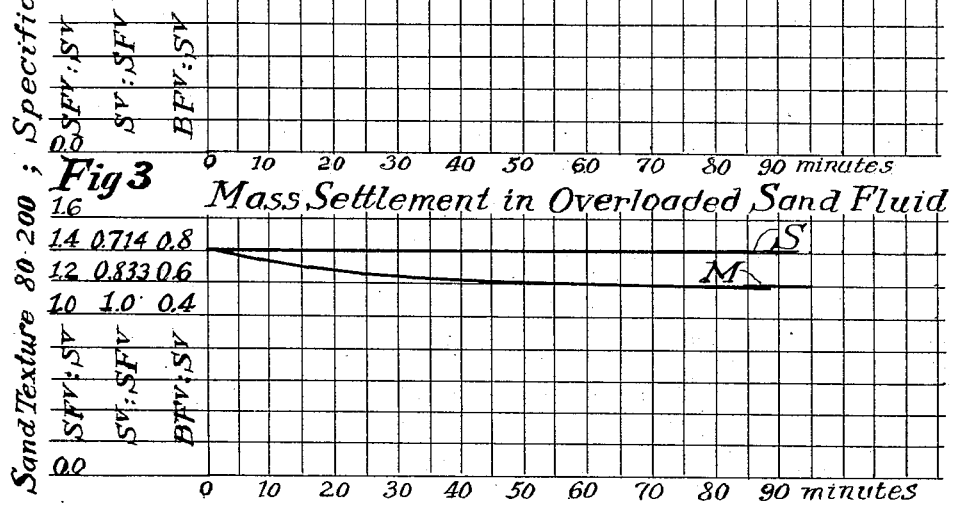
INVENTOR
Wager Fisher
BY
ATTORNEY

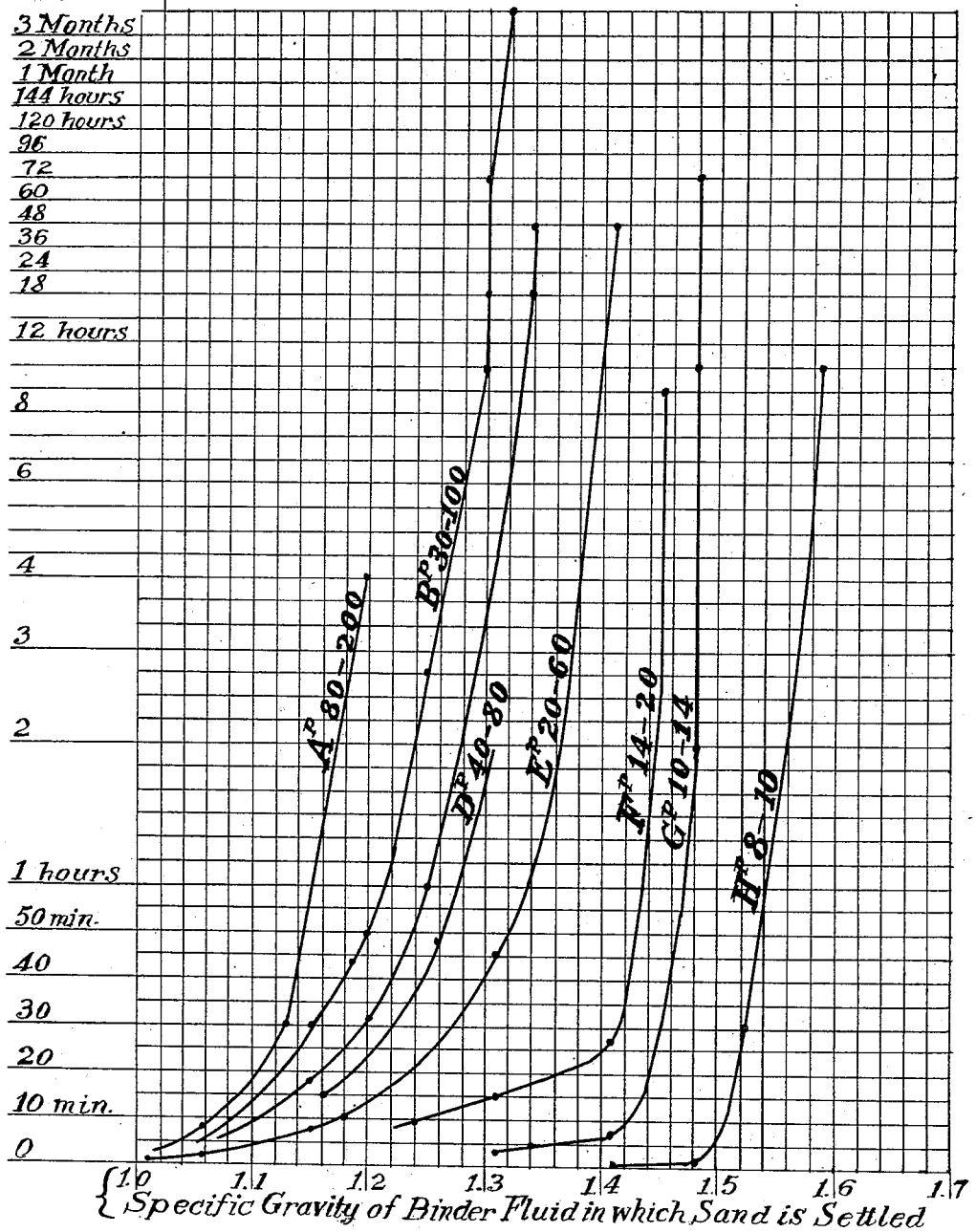

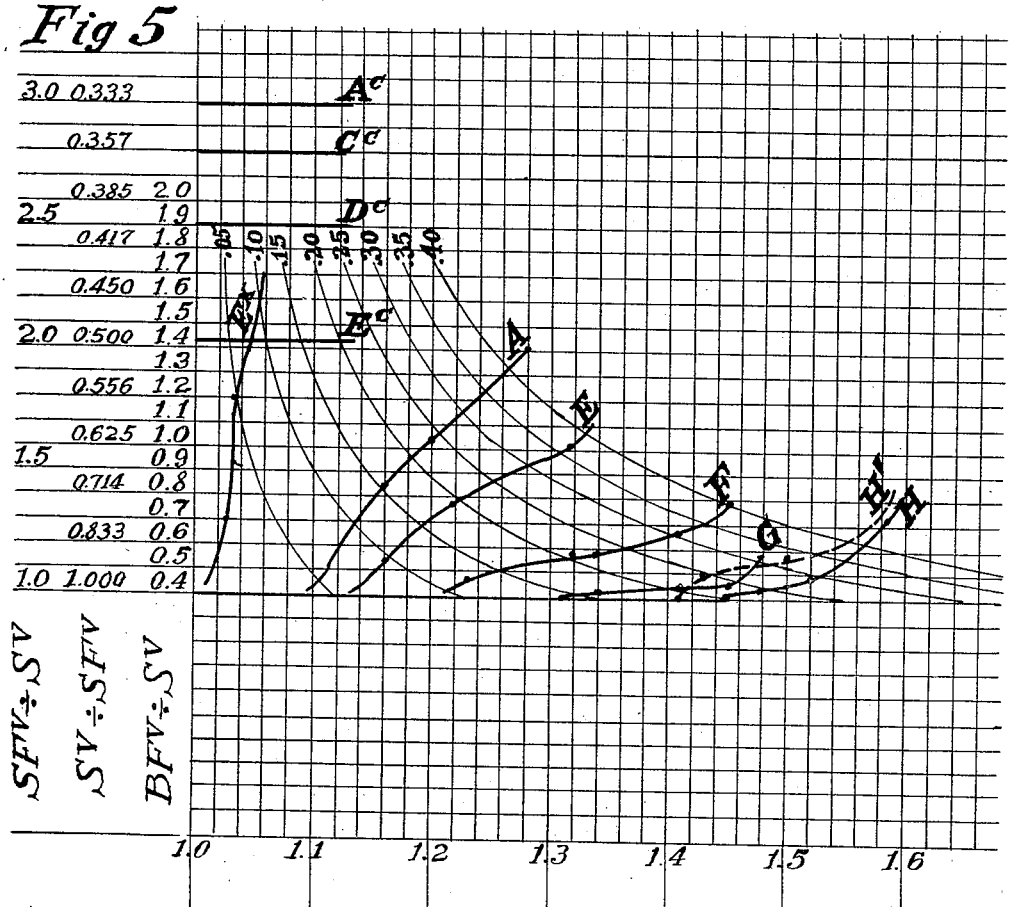
Fig 5
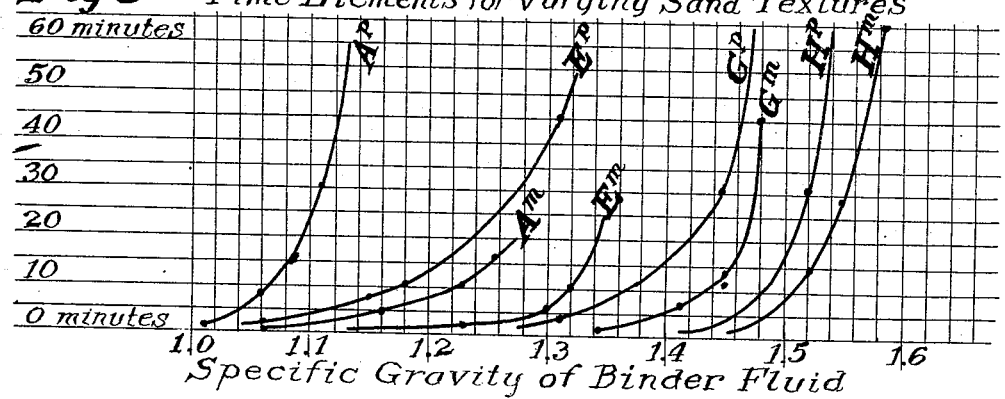
Fig 6 Time Elements for Varying Sand Textures
Specific Gravity of Binder Fluid June 2, 1931. W. FISHER 1,808,161
PROCESS FOR MAKING MOLDING SAND
Filed Aug. 24, 1927 7 Sheets-Sheet 5

INVENTOR.
Wager Fisher
BY
ATTORNEY

June 2, 1931. W. FISHER 1,808,161
PROCESS FOR MAKING MOLDING SAND
Filed Aug. 24, 1927 7 Sheets-Sheet 6

INVENTOR
Wager Fisher
BY
ATTORNEY

June 2, 1931.  W. FISHER  1,808,161
PROCESS FOR MAKING MOLDING SAND
Filed Aug. 24, 1927   7 Sheets-Sheet 7

INVENTOR
BY Wager Fisher
ATTORNEY

Patented June 2, 1931

1,808,161

UNITED STATES PATENT OFFICE

WAGER FISHER, OF BRYN MAWR, PENNSYLVANIA

PROCESS FOR MAKING MOLDING SAND

Application filed August 24, 1927. Serial No. 215,049.

My invention relates to the manufacture of molding sand and is a development of inventions disclosed in my Patent, No. 1,551,738, for process of preparing molding sand, and in a copending application, Ser. No. 52,983, filed August 28, 1925, for method and apparatus for preparing molding sand, Patent No. 1,713,869, being in part a continuation of said application.

An object of my invention is to construct molding sands from a variety of available materials, by reconstructing existing molding sands without or preferably with the addition of foreign binder or by adding binder to sand not containing any initial binder material, with or without screening, using a mixture of such density that the particles do not readjust (other than by coming closer together) during settlement.

A further object is to use sand fluids having a synthesis range in the manufacture of molding sand, and to utilize the synthesis range which is a range of composition throughout which there is mass settlement of the grains of sand and particles of binder when the sand fluid is made quiescent, to accomplish a variety of results.

I may start with a sand fluid underloaded with sand and obtain different grades of molding sand by settling to and subsequently through the synthesis range. The different sizes settle to the synthesis range at different rates, thereby forming layers of different grades of molding sand, the lowermost layer having the larger grains of sand and the grains becoming progressively smaller in the upper layers.

I may start with the sand fluid loaded with sand thereby avoiding segregation of the different sizes of sand grains during settlement to the synthesis range. I preferably then have the sand fluid barely loaded with sand in order to obtain maximum fluidity for more easy screening. A sand fluid is loaded with sand when the sand grains in the fluid have a spacing with respect to one another such that there is substantially no movement of the larger grains through the smaller grains after the fluid is made quiescent.

I may start with an overloaded sand fluid and thereby avoid the necessity for maintaining fairly exact conditions with respect to the size of the sand grains, specific gravity of the binder fluid, temperature of the binder sand fluid, depth of the fluid during settlement, all conditions that would otherwise affect the binder content in the product. When I start with an overloaded sand fluid all that is necessary to obtain a definite binder content in the product is to have the desired binder-to-sand ratio in the overloaded sand fluid. An overloaded sand fluid is one that is initially within its synthesis range.

A further object is to overload a mixture of sand and binder in water with sand which may be of varying sizes so that the sand in settling carries substantially all of the binder with it, settling bodily, the particles retaining their relative positions but gradually closing together, acting effectively as a screen, and leaving nearly clear water above it or about it.

A further object is to maintain a uniform distribution of large and small grains in the product by the use of loaded and overloaded sand fluid mixtures.

A further object is to screen the mixture of sand and binder with water while it is overloaded with sand but still fluid enough to be pumped.

A further object is to combine prepared sands with prepared binder material and water or with prepared binder fluid under conditions of sand, binder and water content which facilitate mass settlement.

A further purpose is to adjust the binder and sand ratio of sand synthesis to the desired sand ratio in the finished product.

A further purpose is to secure homogeneity throughout a large volume of gradually accumulating product. I delay the loss of fluidity of the accumulating mass of overloaded sand fluid within a large storage receptacle by making the sand fluid in the receptacle turbulent at periodic intervals by discharging into it the accumulated product from a relatively small container as it fills.

A further purpose is to determine synthesis characteristics for materials available and to operate the manufacture of molding sand in accord with these characteristics obtained by preliminary tests.

A further purpose is to hasten the elimination of water from the quiescent sand fluid by lateral exfiltration.

A further purpose is to adjust the effective synthesis point, i. e. beginning of the mass settlement range, by adjusting the specific gravity of the binder fluid, texture or size of sand grain, or the depth or temperature of the settling product.

In manufacturing molding sand in accord with my former inventions above referred to, I generally used what I now call unloaded sand fluids and in some cases used loaded sand fluids but had no appreciation of the synthesis range and of the advantages that I am now able to secure by using characteristics of sand within the synthesis range. Generally I operated at specific gravities of binder fluid too low for any material range of synthesis with the character of the sand fluids.

In order to accomplish the purposes of my invention I have devised a process in which by means of turbulence and mixing however accomplished, a large percentage of sand can be floated in a state of relatively uniform distribution as regards both larger and smaller sized grains in a fluid of water and binder material, at the same time thoroughly disintegrating the particles of sand and binder from each other and the process continuing to completion without disturbing the relative distribution of the sand and binder; and also, if necessary, I provide means for freeing the mixture of coarse material and sizing the product. At the same time I regulate the sand-binder ratios to secure a molding sand product of desired binder content.

Particles of binder material are very minute in size, but float apparently as independent units when disintegrated and suspended in water. When so suspended their rate of settlement compared to the larger particles of sand is relatively very slow. Their adherence increases as the water content of a mixture of binder material and water is reduced by exfiltration and evaporation.

The disintegration of sand and binder material and a somewhat homogeneous mixture of these materials with water can be accomplished by stirring the ingredients in a tank and by other simple means similar to the processes of concrete mixing. In this process I do not confine myself to the exact means by which the mixtures I use may be produced but I do describe and set forth a proved means of producing the mixture necessary to my process and the natural laws controlling the process.

The density of a homogeneous mixture of water and binder material is a function of the percentage of binder material floating in suspension or otherwise held in colloidal solution. This density is conveniently expressed in terms of specific gravity.

The addition of sand to such a binder fluid will increase the specific gravity of the mix which may then be termed a sand fluid because if the binder fluid be comparatively rich or dense, i. e., of high specific gravity and if the sand be a considerable portion of the fluid the sand will settle very slowly through the binder fluid and the mix may conveniently be called a sand fluid and as such be pumped or flowed, a slight turbulence maintaining the sand in suspension. The fluid may then be said to be loaded with sand.

If, however, still more sand be added to the fluid a point is reached beyond which the sand grains are so close together that they no longer will settle in and through the fluid but the sand and entrained binder material will settle or exfiltrate bodily, as a mass or cloud by the expulsion of water, and contracting correspondingly. This beginning of synthesis is termed the point of synthesis and differs for different sizes of grains and for different combinations of sizes of grains. From this point on up, if the percentage of sand be gradually increased, the binder fluid density remaining the same, the sand fluid will gradually become semi-fluid and then plastic to a degree, in which turbulence and mixing may no longer be applied successfully to accomplish substantial homogeneity, as the grains of sand will then be rubbing against each other and uniform distribution and mixing of sand grains through the binder fluid will no longer be practicable. It is above and within this range of synthesis that my process is applicable and within this range the sand fluid may be said to be overloaded with sand.

If a mass of sand by turbulence be distributed through a mass of water and then quiescence be quickly applied, the sand grains, if they form a sufficient percentage of the total volume, will be so close together that the entire sand mass will settle as a cloud with a roughly defined top level. The larger grains of sand have little opportunity to pass the more slowly settling smaller grains. In a binder fluid, however, a distributed sand mass, due to the great viscosity of the binder fluid, has greater tendency to differentiate the rate of settlement between large and small grains. Hence in producing a uniform molding sand the necessity for overloading the sand fluid with a large percentage of sand to preserve uniformity is apparent. Not only is the uniformity of the product assured but the capacity of the machine is greatly increased as less water has to be handled.

In my previous invention where I make use of progressive settling of sand in and through a binder fluid, and use a large excess of such fluid, the settling is accomplished with overflow of surplus binder fluid in a compartment of comparative quiescence and uniformity is preserved by continuity of the process. In this present process it is my object to fill a series of settling compartments, and to use small enough compartments so that each may be completely filled before any appreciable change can take place in the mixture. This greatly assists uniformity. In the case of even lean binder fluids well loaded with sand or overloaded with sand a change takes place much more slowly than if a smaller percentage of sand be carried in suspension. Therefore the size of the compartment must be roughly adjusted to the time element of the mix used and the rate of production of the machine. Absolute quiescence can in this way be applied to each compartment as filled, thus permitting the molding sand to form undisturbed. I thus mix the ingredients to the proportion and relation intended and transfer to the tanks to settle or exfiltrate.

The point at which mass settlement or mass exfiltration begins, that is the point of synthesis will determine the ultimate binder content in the product whenever the initial sand fluid is not already within the synthesis range, that is, not already overloaded with sand. This makes it necessary to control the synthesis point whenever the sand fluid is not already within the synthesis range in order to definitely determine the binder content in the product, whenever, as in this invention, loaded sand fluids are used as contrasted with underloaded sand fluids.

I prefer to treat the mixture of sand and binder in water as a sand fluid, for convenience, though it may not be truly a fluid. When this mixture is overloaded with sand so that bodily or mass settlement would take place, it means that the grains of sand and the binder are arranged in the sand fluid in the same relative order as in the finished product though the grains and particles are spaced further in the sand fluid than in the settled product. Elimination of water will take place by mass or bodily settlement or by exfiltration without disturbance in the arrangement of the sand and binder elements. The fact that the arrangement is thus determined in the mixture has led me to treat the range of overloading for which this fixity of arrangement takes place as the synthesis range.

If the total capacity of the plant be intended to be small, and the machine for mixing be relatively large, there is no trouble in distributing to settling or exfiltration beds or compartments direct from the machine, as the sand fluid may be permitted to flow by gravity directly into the intended bed and the cross section of the stream and speed of flow fills the beds quickly enough for the bed to remain a sand fluid of its original composition up to the time when the filling operation is complete and will settle or exfiltrate as an entirety.

However, when it is desired to use settling or exfiltration beds of relatively large capacity as compared with that of the machine settling or exfiltration in one part of the bed begins to separate water upon the top of the bed before the bed is completely filled, with the result that successive layers of synthesized sand fluid will deposit and there is danger of these layers being so thin that separation by spreading will take place. Also there is danger of a change of composition because of new sand fluid coming in contact with water filtered out of sand fluid which has preceded it.

Where the settling or exfiltration beds are large relative to the capacity of the machine, the fluid will not flow the entire length of the bed.

To avoid all of the difficulties named I, therefore, provide an intermediate pool for collection of synthesized sand fluid, fill the pool and then discharge the pool content of sand fluid to the settling tank at one flow, thus renewing turbulence of the sand fluid, maintaining the uniformity and providing quick and complete distribution over the entire area of the settling or exfiltation bed. By successive filling operations of this character I provide for a few layers of sufficient depth to ensure quick distribution of the sand fluid and consequent substantial uniformity of the product.

Thus if the allowable time element for filling the intermediate pool be an hour, for example, the last flow from the intermediate pool to the settling or exfiltration bed will not have been quiescent for more than an hour when the new flow from the intermediate pool takes place again applying turbulence and prolonging the time for settlement or exfiltration another hour. Any mixing that takes place does not change the composition since compositions of equal characteristics are being mixed.

Because there is substantially no surplus binder left to settle upon the top of each layer there is substantially no difference in the composition at the division line between layers from the composition in the middle, for example, of a layer.

While the quantity of water directly affects the percentage of sand in the sand fluid, it does not within the synthesis range affect the ultimate composition which is determined by the ratio of sand and binder. Too little water will result in the formation of a sand fluid within the plasticity range, for the reason that the binder fluid will not be sufficiently expanded to enough separate the sand grains to produce a sand fluid pumpable, screenable or flowable, although it may be mixable and still within the synthesis range.

A sand fluid of this density, as thick or thicker than very thick molasses, while it could not be screened, could be used advantageously for combining prepared dry sand with prepared concentrated binder fluid and could be placed in a settlement bed to contract by exfiltration and evaporation, and comes within the range of my invention.

I have discovered that the outlet channel from the machine to the bed or to the intermediate pool should be so proportioned to the capacity of the machine and to the slope of the channel that the speed of discharge will maintain a turbulence of the product so that there will be no substantial tendency of sand or even of the finished product to deposit out of the flowing stream. This is easier than would otherwise seem for a sand fluid so overloaded with sand, for the reason that the same characteristic which causes it to settle or exfiltrate as a cloud or mass, i. e., bodily, keeps the sand from settling out from the fluid into the discharge channel even where the speed of travel is not very high. If sand begins to clog up a trough or channel which has been working properly before it is usually an indication that the percentage of sand in the sand fluid is too low.

Where the discharge takes place in a relatively small stream direct to the bed or into the intermediate pool it is best to leave it splash into the pool from above rather than to have it flow in at one edge, since the splashing of the sand fluid into the pool continues the turbulence of the bed or pool. Any slight turbulence serves to keep the sand fluid in proper condition for a long time.

The intermediate pool serves the additional function of equalizing irregularities in the supply of raw material and irregularities in operation due to carelessness, such, for example as allowing the sand content to become low for a time.

When I speak of the percentage of sand in suspension in sand fluid I am speaking of the equivalent volume of that sand as clean, dry sand. Thus from my viewpoint in this application, if there be 60 percent sand in a sand fluid there would be binder fluid not only to fill the remaining 40 percent but to fill the voids which would be present in the 60 percent as dry sand, approximately 40 percent of voids. These voids, therefore, represent approximately 24 percent of the entire 100 percent considered. This view has been adopted for convenience in treatment notwithstanding that in the above example it presents the anomaly of having 60 percent of sand in the sand fluid which has 64 percent of binder fluid.

I have preferred to illustrate one main form only of my invention with some slight modifications, among many forms, selecting the form described because it is practical, efficient, cheap and reliable and at the same time well illustrates the principles involved.

Figures 1, 2, 3, 4, 5, 6, 7 and 12 are diagrammatic illustrations used in explaining my invention.

In the drawings similar numerals indicate like parts.

Figure 7:
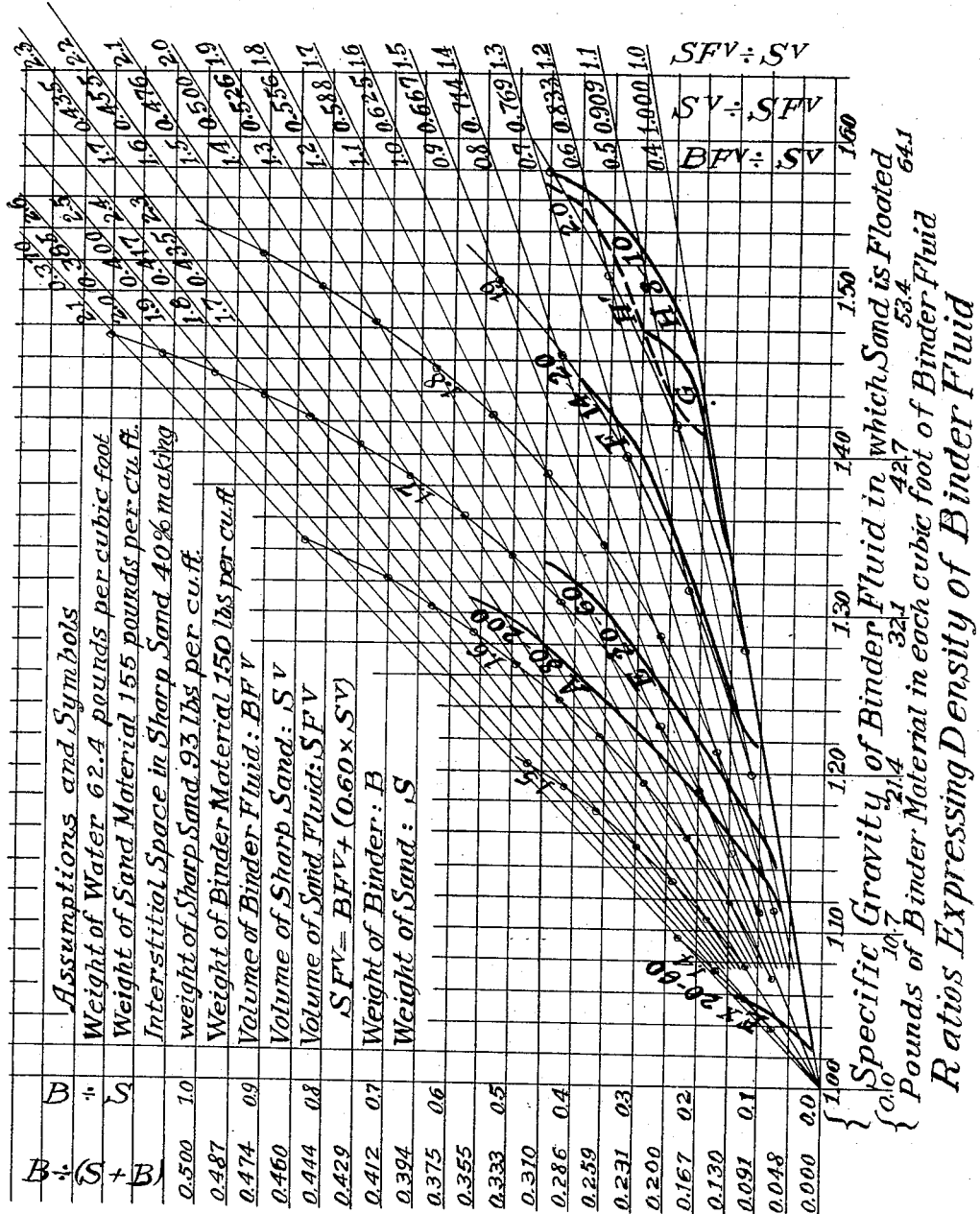

Referring to the drawings and describing in illustration and not in limitation:—

In my earlier inventions above referred to I manufacture homogeneous molding sand by applying first turbulence and then quiescence to a mixture of sand, binder material and water, but usually carried out my invention with binder fluids of lower specific gravity than that to which the present invention finds its best application.

In my patented invention I manufactured molding sand using, generally, binder fluids of specific gravity low enough to ensure the settling of the molding sand through the binder fluids at reasonably rapid rates. In carrying out my process I usually had an excess of binder fluids. My present invention, made subsequent to the application resulting in the patent, is in part disclosed in my pending application of which this is to that extent a continuation. I discovered that when the specific gravity of the binder fluid is higher than a certain range, which depends on the fineness of the sands and fineness of binder material, there is a range of synthesis within which the relative quantities of sand, binder and water are such that the sand and binder particles settle or exfiltrate together when quiescence is applied without substantial relative motion except that of drawing together as the entrained water escapes.

I find this range of sand and binder concentration increases as the specific gravity of the binder fluid rises and also that it is wider for the same specific gravity of binder fluid when the sand grains are small than when they are large, wider when the temperature is low than when it is high, and wider when the depth of sand fluid is great than when it is small.

In Figures 1 to 7 I have shown graphically the principal properties of sands, binder fluids and sand fluids, which I make use of in accomplishing the production of molding sands of uniform properties and desired binder contents. The density of binder fluids I express in terms of specific gravity, which is a measure of the amount of binder material in the fluid, and for the particular fluids shown on the curves, each one-tenth increase in specific gravity corresponds to 10.7 pounds of binder material per cubic foot of binder fluid. I have found that control of the product is dependent on the control of several factors, the principal of which are size of the sand grains, which I call sand texture, density of binder fluid, assuming its texture constant, and thirdly sand concentration. If in proper ratio, I am able to procure a number of desirable results whose inter-relations are shown by the curves in Figures 1 to 7 and 12.

Speaking first of sand concentration according to the degree of concentration or as otherwise may be said the distribution of the sand, or its expansion in the fluid, there are three different forms of sand settlement, which for convenience I have termed progressive, cloud and mass settlement, corresponding to three different degrees of concentration which, for convenience, I have termed underloaded sand fluid, loaded sand fluid and overloaded sand fluid. In the order mentioned, the first is the least stable and requires the greatest degree of turbulence to maintain the fluid in the state of suspension; the second is considerably more stable and the third has quite different properties from either of the two preceding and under adjusted conditions is the ultimate form of sand fluid into which the first two are transformed by the process of settling in quiescence. The last form, i. e., overloaded sand fluid, has the property of contracting by settlement and at the same time retaining substantially all the binder fluid within the interstitial spaces between the sand grains. In the process of settling, contraction is accomplished by the expulsion of water, (i. e. clear water) under adjusted conditions. This process of expelling water I call exfiltration, (i. e. extrusion) because if the sand fluid is allowed to be quiescent in a watertight container, the movement of water is to the upper surface where it appears as a layer on top of the sand fluid, but if on the other hand the sand fluid has a place for quiescence in a porous container, such as a pool, the banks of which are sand or for instance in a pool the walls of which are made of slats overlaid with a fabric, such as burlap, of a close enough weave to retain the sand, or again for instance, in a burlap bag, exfiltration may be in all directions.

In the case of the underloaded and loaded sand fluids, the sand grains will settle in and through the binder fluid, drawing closer and closer together, until the interstitial space between the grains is reduced to an amount, which corresponds to the density, i. e. specific gravity, of overloaded sand fluid. Beyond this point, further contraction by settlement is by exfiltration of clear water only, all the binder material being entrained within the sand grains.

In the process of progressive settlement and of cloud settlement, the slight turbulence produced by the escaping currents of binder fluid serves to keep the binder fluid itself in suspension.

The process of progressive settlement from an underloaded sand fluid is illustrated in Figure 1, which is typical of an 80 to 200 mesh sand texture in a 1.16 specific gravity sand fluid. In this figure the abscissæ represent time in minutes from the moment of quiescence. Three sets of ordinates are shown, the left hand figure being the sand fluid volume to the sand volume ratio. In all the figures I have assumed the sand volume as the volume of a mass of dry-cleaned sand, which is also substantially the mass of the same volume of sand settled in clear water. By referring to Figure 1, it will be seen that the total volume of the sand fluid, according to this ratio is 3.4 times the volume of the sand. It is also assumed that the interstitial space, commonly called void space, in the mass of dry cleaned sand is 0.4 of the volume of the sand. By referring to Figure 1, right hand column it will be seen that the interstitial space at the moment of quiescence is nearly 2.9 times the volume of the sand or more than seven times the interstitial space of the dry cleaned sand. This greatly expanded interstitial space is of course filled with binder fluid of 1.16 specific gravity.

At the moment of quiescence, the suspended sand grains, under the action of gravity start for the bottom, those nearest the bottom arriving there first and building up a sand mass progressively increasing in depth until all the sand is down leaving behind an excess of binder fluid, but at the same time trapping within the interstitial spaces of the settled sand, a certain volume of the binder fluid. By referring to Figure 1, it will be seen in this particular case that the progressive settlement is complete in about four minutes and at an expanded volume of about 1.55 and a corresponding interstitial space of about 0.95.

Assuming that the sand is always of the same texture and that the same kind of binder material is always used, I have determined by a large number of experiments and the actual production of the sand on a tonnage basis that the interstitial space and the consequent volume of binder fluid trapped within the interstitial space at the point where progressive settlement is complete is substantially constant for given specific gravity of binder fluid and sand concentration and I am thus enabled to produce a molding sand of substantially constant binder content by controlling the specific gravity of the binder fluid in which the sand settles.

The stage or point in settling at which progressive settlement has been completed, and from which point on further contraction of the sand mass is by expulsion or exfiltration of water, I have termed for convenience the synthetic point. From this point on the contracted sand mass gradually reaches what may be termed a state of plasticity, beyond which point the contracting sand mass is no longer fluid or semi-fluid.

Within the state of plasticity uniform relative distribution of the sand grains by turbulence is no longer practical of accomplishment, but this plastic sand mass can be removed and dumped in a pile for further exfiltration and evaporation of the contained water. As will be explained later this is most easily accomplished by pouring or skimming off the supernatant surplus binder fluid and water at about the time plasticity is reached.

The times for attaining plasticity for a number of sand textures are illustrated in Figure 4.

In Figure 2 I have illustrated typical form of cloud settlement, using the same sand texture and density of binder fluid as shown in Figure 1. In this case the expanded sand volume at the moment of quiescence is very much less than in the case where progressive settlement is illustrated and is, namely, about twice the sand volume. By referring to Figure 2, it will be seen that for an 80 to 200 texture sand, curve M that the expansion at which cloud settlement begins is roughly two sand volumes. Referring again to Figure 2, it is seen that the settling sand instead of having a progressing form of settlement descends toward the bottom as a sort of cloud with a roughly defined top surface and at the end of about six minutes has contracted to a volume of 1.45 sand volumes, with an interstitial space of about 0.90, beyond which point the rate of settlement suddenly becomes much slower. It is at this point that mass settlement begins, and from this point on no more binder fluid is expelled, but water only. It will be observed that in both cases the interstitial space at the point of synthesis, i. e. beginning of mass settlement is substantially the same and therefore the entrapped binder material substantially the same.

Referring now to Figure 3, I have in this figure illustrated a sand fluid which initially is in a synthetic form, i. e. has the necessary sand concentration and density of binder fluid to insure mass settlement. By a study of this figure, it will be seen that above the surface of the contracting sand mass is water only, with possibly a very slight amount of extruded binder fluid, but so negligible in amount that in the finished product it is hardly noticeable.

By referring to Figure 5, curve A, for 80 to 200 texture sand, it is seen that about a specific gravity of 1.1 of binder fluid, the interstitial space at the point of synthesis, i. e. moment in which mass settlement begins starts to increase beyond the normal void space in the sand, i. e. 40%, and that at a specific gravity of 1.28, the interstitial space has increased to 1.4 or 3½ times the normal void space. Curve E, illustrates the action of 20 to 60 texture sand; curve F, 14 to 20 texture sand; curve G, 10 to 14 texture sand; curve H, 8 to 10 texture sand; curve H', 8 to 10 texture sand with a mixture of some finer sand.

In all the figures I have used the same key letters A to H for corresponding sand textures. Curve Ex illustrates the action of a 20 to 60 texture sand and a different kind of binder fluid which is of much greater fineness and corresponding viscosity, greatly changing the point of synthesis. I have introduced this curve as an illustration of the fact that in constructing or reconstructing a molding sand, the particular properties of the binder material must be established in order to produce the desired binder content in the products, when making use of the properties of progressive, and cloud settlement. I will later illustrate how I make use of the properties of mass settlement to produce a molding sand of desired binder content by working within the range of mass settlement, i. e. within the synthesis range.

In Figure 6, using the same key letters, as in the other figures, to designate the different sand textures, I have illustrated the length of time required to reach the moment of mass settlement compared with the length of time to reach plasticity. These times, of course, are subject to considerable variation due to minor irregularities, but it is seen that the time to reach mass settlement, or synthesis point, is very much less than to reach plasticity. Therefore, in filling a pool or container with the sand fluid, which is either underloaded or loaded, the size of this pool must not be so great but that the slight turbulence during the time of filling will be sufficient to maintain the sand fluid in suspension after which, of course, quiescence may be allowed and the sand permitted to settle until it reaches a state of plasticity, after which the surplus binder fluid may be skimmed off. If the pool be allowed to exfiltrate or dry by evaporation, the dried surplus binder material on the surface may be removed by shoveling or otherwise.

Where a pool is being filled with a loaded sand fluid, it is also important that the slight turbulence involved in filling the pool maintain the sand fluid until the pool is filled and is ready for quiescence.

In filling the pool, it is desirable that the sand fluid drop into the pool from a slight elevation as greater turbulence is thus maintained. Inasmuch as homogeneity and uniform relative distribution of the sand grains has been accomplished in preparing the sand fluids in the apparatus used for the purpose, any turbulence that I use in the settlement pools is only for the purpose of maintaining the fluid until the pool can be filled and quiescence applied.

Referring now to Figure 7, this figure illustrates the same inter-relations as shown in Figure 5, but the ordinates represent the binder content in the product, expressed in two parallel ratios, weight of binder material to total weight (B; (S+B)) and B to S. The sand concentrations, expansion and interstitial space are shown in three parallel columns on the right hand margin, the figures referring to the radial lines. Another set of curves is also shown marked by the figures 1.4, 1.5, 1.6, 1.7, 1.8, 1.9 and 2.0 which indicate the specific gravities of the sand fluids at any intersection of the ordinates and abscissæ. The corresponding sand concentrations can be read by following from any intersection along the radial lines to the right hand scale. Using the same letters A to H to indicate the sand textures, I have shown the action of several sand textures by curves A to H, each curve indicating the binder content of the same fluid at the moment of commencement of mass settlement, i. e., synthesis point, when the sand is settled in underloaded and loaded sand fluids. Thus, for example, if it were desired to produce a molding sand of 20% binder content using 80 to 200 texture sand, extend the ordinate 0.20 horizontally to the right to its intersection with curve A, then reading vertically below, a specific gravity of binder fluid of slightly over 1.20 would be required. The corresponding specific gravity of the sand fluid by interpolation would be about 1.67 specific gravity, and reading along the radial lines the interstitial space would be about 1.05, the percentage of sand carried in the sand fluid about −.60, and the volume of the sand fluid about 1.65 sand volumes.

When making use of underloaded and loaded sand fluids for the production of molding sand, it is necessary to maintain the synthesis point at a value to give the desired binder content in the product. Usually this means maintaining the specific gravity of the binder fluid at a fairly constant value, by maintaining a uniform relation between the added binder and added water, and to maintain the continuity of the process until the settlement pool is filled, after which the sand fluid in the pool is not disturbed until the stage of plasticity is reached. The binder material and water lying above the settled sand may then be removed.

If the sand fluid is not overloaded and the specific gravity of the binder fluid varies, the binder content in the product will correspondingly vary because of change in the synthesis point.

The content of binder material in a given weight of product is determined by the specific gravity and intergranular volume of the binder fluid at any point of its mass settlement and therefore by the specific gravity of the binder fluid and the intergranular space at the beginning of mass settlement with sand fluids initially above the synthesis range.

In using an overloaded sand fluid, the binder content in the product is determined by the relative proportions in which the sand and binder material are fed to the apparatus because no excess binder material in the form of binder fluid is expelled by the sand mass in the process of settlement and contraction, only water being exfiltrated. It is thus possible while maintaining a constant relative feed of sand and binder material and operating the process continuously to preserve the same binder-to-sand ratios in the product.

In practice, the point of synthesis seems to be very much higher when sand grains are very small than when they are relatively large.

The period of settlement through the synthesis range may be one of gradual dilution of the binder fluid above the settling sand fluid in the synthesis range because the binder fluid is receiving substantially pure water filtering upward from entrainment between the still settling particles of sand and binder. Settling binder, however, out of the supernatant binder fluid and loss of water through the walls of the container may or may not according to circumstance more than compensate for this dilution of the overlying binder fluid during mass settlement of the sand fluid.

The particles of binder settle so much more slowly than the grains of sand that at the point of synthesis any settlement of the binder particles is in practice usually insignificant.

If the homogeneous turbulent sand fluid has a composition such that it is already beneath its synthesis curve then when it is made quiescent there is no relative settling of the grains of sand through the particles of binder but merely a gradual drawing together of the sand and binder particles, substantially pure water filtering from entrainment in the sand and binder.

The binder content of the molding sand product is thus determined by the binder-to-sand ratio of synthesis, whether the homogeneous turbulent sand fluid has a binder-to-sand ratio above or below that of the synthesis point.

In the first case the binder-to-sand ratio of the product is that of the synthesis point on the curve line showing upper limits of synthesis and in the second case it is below this curve but is the synthesis binder-to-sand ratio in that it is a ratio that does not change during settlement and that definitely determines the binder content of the molding sand product.

In order to produce molding sands of larger binder contents, I have found it necessary to increase the specific gravity of the binder fluid in order that the interstitial space at the moment of mass settlement shall be greater and therefore entrap more binder material. I again found it necessary to know the properties of the binder material used and also the sand texture in order to determine what that interstitial space would be at the moment of mass settlement.

Controlling binder content by means of interstitial space at the moment of mass settlement for convenience, I term 2-factor control. In the control of binder content in the product using an overloaded fluid as above stated, I maintain the proportions of binder material to sand material as fed to the apparatus in the product by controlling the concentration of the sand fluid to be within the range of mass settlement. In this case also it is necessary to know the properties of the binder material in order that the sand concentration in the sand fluid and the density of the binder fluid in the sand fluid shall be in such relation that the sand fluid will have the properties of mass settlement. This, for convenience, I call three factor control, which terms I shall use in describing the apparatus illustrated in the Figures 8 and 9.

Referring again to Figure 7 and taking as an example a desired binder content in the sand of 13% extending ordinate 0.13 to curve E, 20 to 60 mesh sand, and reading vertically below requires 1.19 binder fluid. From the same intersection reading along the radial line requires a sand concentration of .769, which is the equivalent of the interstitial space of 0.7. When a sand concentration becomes as great as this, the sand fluid is usually beginning to become quite thick in its nature and not so readily pumped and screened. Therefore, in this particular instance a loaded sand fluid with a slight excess of binder fluid would probably be more desirable.

In the case of the 14 to 20 mesh sand, curve F, assuming that the same binder content of 13% were desired in the product would require a binder fluid of 1.25 specific gravity and a sand concentration of about 87%, a still more difficult fluid to pump and screen. In both these examples, it would probably be best to use a loaded sand fluid so as to have greater fluidity and allow the control of binder contents to be determined by the adjustment of the synthesis point.

In the case of higher bonding contents, say 20% and sand texture 20 to 60, curve E, I would prefer to use three point control building up the sand fluid to a point slightly within the range of mass settlement, i. e., synthesis range, constructing a sand fluid at a specific gravity of approximately 1.8 at which specific gravity the sand fluid can be readily pumped and screened. I have cited the above examples to show that the best results with my process are obtained by working the sand fluids at or near the concentrations coincident with mass settlement, but in certain cases I may work them considerably without, or within, the range of mass settlement, in which latter case I may even, with prepared sands and binders, work the sand fluid at a sand concentration so great that the sand fluid is within the edge of the plasticity range, in which case I would use other than pumping apparatus to apply turbulence and mixing. In this case I would prefer to prepare the binder material separately into a binder fluid and then insert the sand grains in the fluid by process of mixing and turbulence, which would insure the proper distribution of the sand grains throughout the binder fluid, even though the interstitial space was not very greatly expanded beyond the normal amount of 40%.

I prefer to call the mixture of sand and binder with water a sand fluid, for convenience, though it may not be in every case truly a fluid.

The requirements of foundry practice are usually such as to call for a fine texture sand with a comparatively small amount of binder or a fine sand with a comparatively large amount of binder; and also a coarse sand usually with a comparatively large amount of binder and probably containing an admixture of some finer sand.

For instance, referring to curve H' in Figure 7, an 8 to 10 mesh sand with some finer sand might be desired with a binder content of 0.31 which would call for a 77% concentration which, although it is a fairly thick liquid to pump and screen, is within the range of practicability.

Now referring to Figures 8 and 9 which illustrate a proven type of turbulence apparatus, it is seen that the screened sand fluid is permitted to drop into a movable pool or car 15, which when filled is moved along a track 16 and allowed to quiesce until sufficiently plastic for the surplus binder fluid and water to be skimmed off by tilting the car without stirring up the settled sand below; after which the contents of the car may be dumped into a stock pile 17 to complete the process of water elimination which takes place by exfiltration and evaporation. This would be making use of two point control with surplus binder fluid.

If, however, three point control was used with the sand fluid within the range of mass settlement, as soon as the car was filled it would be dumped into a settlement pool 18, a succession of cars being dumped until the pool was filled, the act of dumping the car producing sufficient turbulence in the pool to maintain the sand in the pool fluid until the filling of the pool is complete.

If for any reason, as for instance, because of cessation of operations overnight, the pool was only partially filled, the filling of the pool could be completed the next day, as it would probably have acquired sufficient plasticity over night for the fresh sand fluid to flow over the now plastic sand fluid placed in the pool the previous day and no noticeable layers would be apparent in the product because when the contracting sand mass achieves a certain degree of plasticity, a very violent sand fluid can be run over it without disturbing it or causing an admixture of the plastic sand mass with the new sand fluid. Any supernatant water will usually have disappeared over night by exfiltration and evaporation, and if the settling mass has become non-fluid (plastic) it is usually well to wait until any supernatant water of exfiltration has substantially disappeared before adding a fresh charge on to the plastic bed already present.

In filling a large settlement pool by a succession of dumpings from a movable pool, I have found out that in preserving homogeneity in the product, each dumping of a movable pool should produce a sufficient rise in the settlement pool to be a substantial increase in depth, and this is especially the case for the first load dumped in after an over night cessation or in starting a new settlement pool, because if the sand fluid merely spreads out as a film over the bottom, thinning out at the extreme end to a mere toe, there is a tendency for the larger sand grains to remain behind and more of the small grains and binder fluid to roll to the extreme point.

Figure 10:
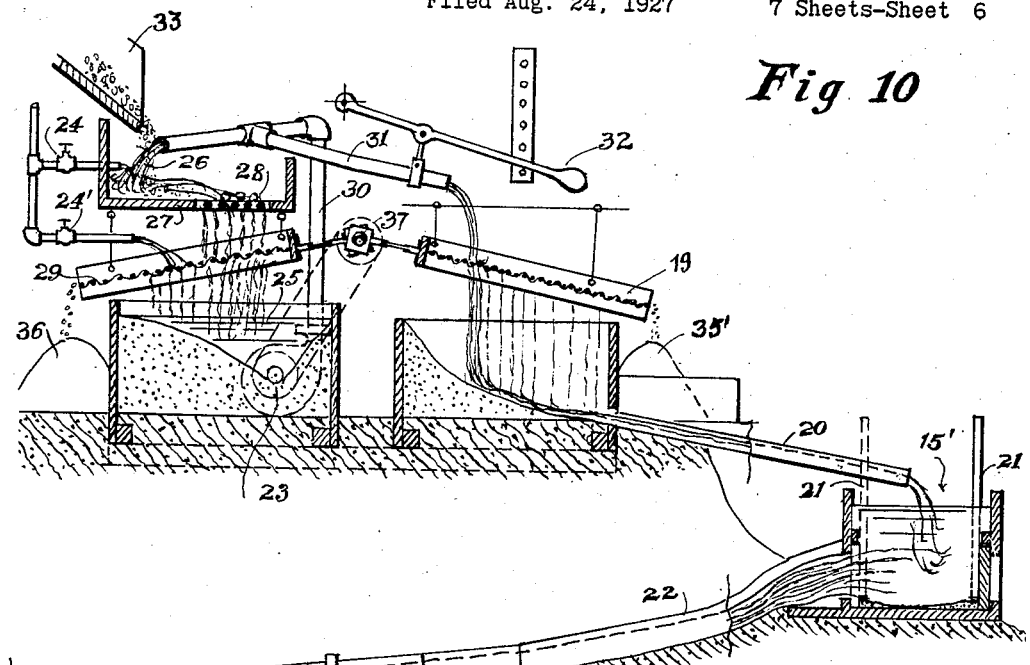
Figure 10 is a diagrammatic, sectional elevation showing a slightly modified form.
Figure 11:
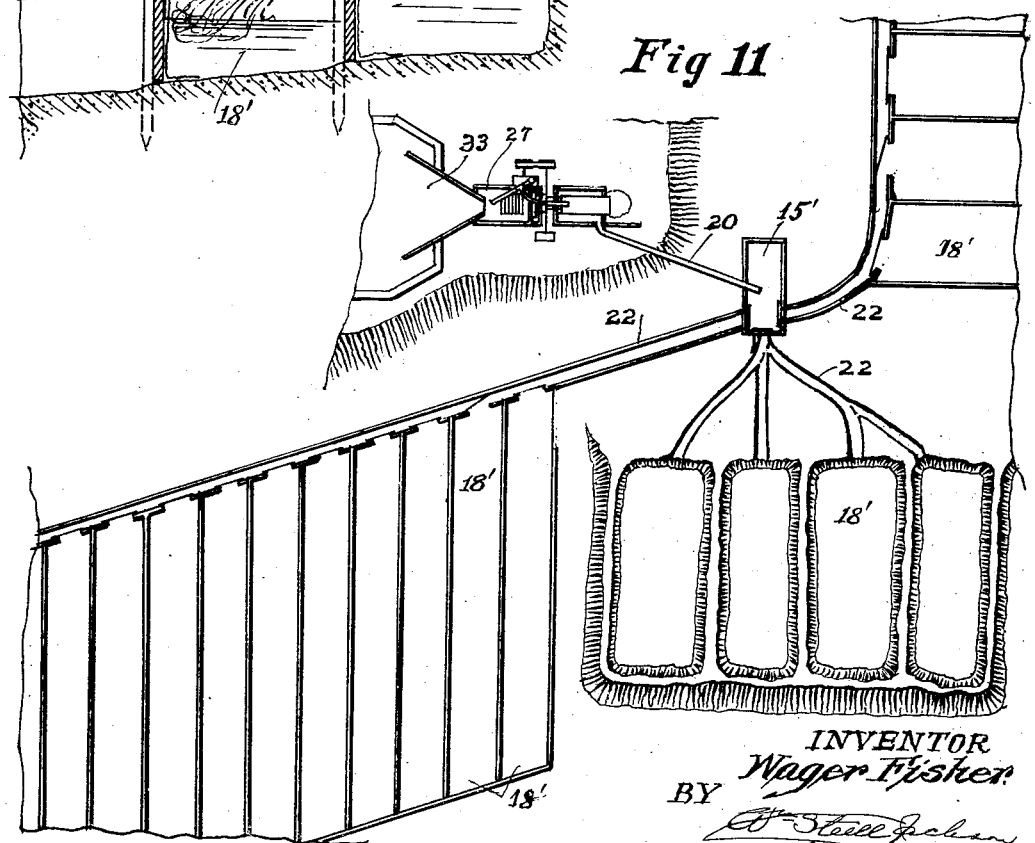
Figure 11 is a top plan view of Figure 10.

I show in Figures 10 and 11 a slightly different arrangement that is especially well adapted to the use with a flowable overloaded sand fluid and in which no movable pools or cars are used.

Here the sand fluid flows directly from under the screen 19, which is vibrated by cam shaft 37, into an inclined channel 20 to an intermediate pool 15' of size proportioned to be filled satisfactorily in accordance with the rate of production of the turbulence apparatus.

This intermediate pool 15' is then emptied by opening a suitable gate 21 which permits the contents to flow down through another suitable inclined channel 22 or 22' into any one of a number of larger settlement pools 18', each of which when filled by successive charges from the pool 15' is permitted to quiesce, exfiltrate and evaporate.

By diverting the inclined channel or channels into one settlement pool after another, a succession of pools may by filled holding in all perhaps many thousands of tons of sand by the time exfilteration and evaporation processes at the first filled pool have eliminated excess water and the sand removed for shipment. In this way the process is preferably continuous the first large pool being ready to be refilled by the time all of the other pools have been filled.

Two point control using an underloaded sand fluid is sometimes advantageous in that if it is desired to separate out sizes of sand in which the difference of size is too small to admit of screening or the finer particles are too small to be separated by differential screening, the sand fluid may be allowed to partially settle in the movable pools and if the specific gravity or concentration of the sand fluid is sufficiently thin and the mass not too great in depth, there will be a tendency for the larger grains to settle first leaving a certain proportion of the smaller grains still suspended in the binder fluid for the reason that the synthesis point of the finer grain is at a less degree of concentration than the coarser grains. When the settlement of the larger grains has been accomplished, the supernatant portion containing the smaller grains may be poured off while still in the condition of the sand fluid and transferred to a separate settling bed or retreated to further dilute the binder fluid, thus making a second separation of sizes as circumstances may warrant, or the manufacture of binder material.

A somewhat similar action I have found to be accomplished by dumping the sand fluid or running it from an intermediate pool into elongated settlement beds so that the sand flows out in a comparatively thin film, the finer grains flowing to the far end of the pool. When the pool has settled and dried by evaporation, in excavating the product the two grades of sand may be obtained.

In the operation of the turbulence apparatus and in all parts of the process including the final filling of the settlement bed, constant speed operation is desirable. Operation of the turbulence apparatus at a constant speed, the flowing in the channels at a constant speed, the filling of the beds at a constant speed are all conducive to uniformity of product.

Especially in the matter of screening is constant speed desirable as the vibrating screen passes sand grains that are more uniform in size.

Referring again to Figures 8, 9 and 10, these figures are drawn to illustrate somewhat diagrammatically the operation of a proven turbulence apparatus and although distribution and binder material in the sand fluid may be accomplished by a variety of apparatus, either in batches or continuously, the absorbing of the sand and binder material into a circulating stream has proven to be very practicable when using the apparatus shown.

In starting my circulating stream, I first start the centrifugal pump 23, and then open the valve 24 allowing water to flow into the chamber 25. When sufficient water has been admitted, the pump will be throwing a full stream 26 into the hopper 27 which stream drops through the bar grating 28, through the coarse screen 29, thus returning to the pump for recirculation.

Figure 8:
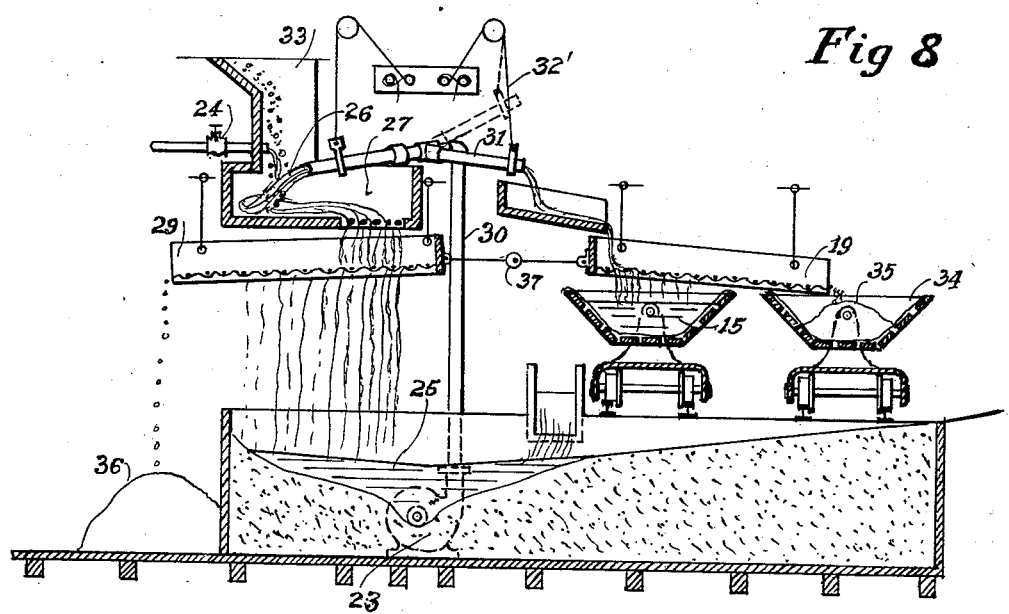
Figure 8 is a sectional side elevation of a structure by which my process may be carried out.
Figure 9:
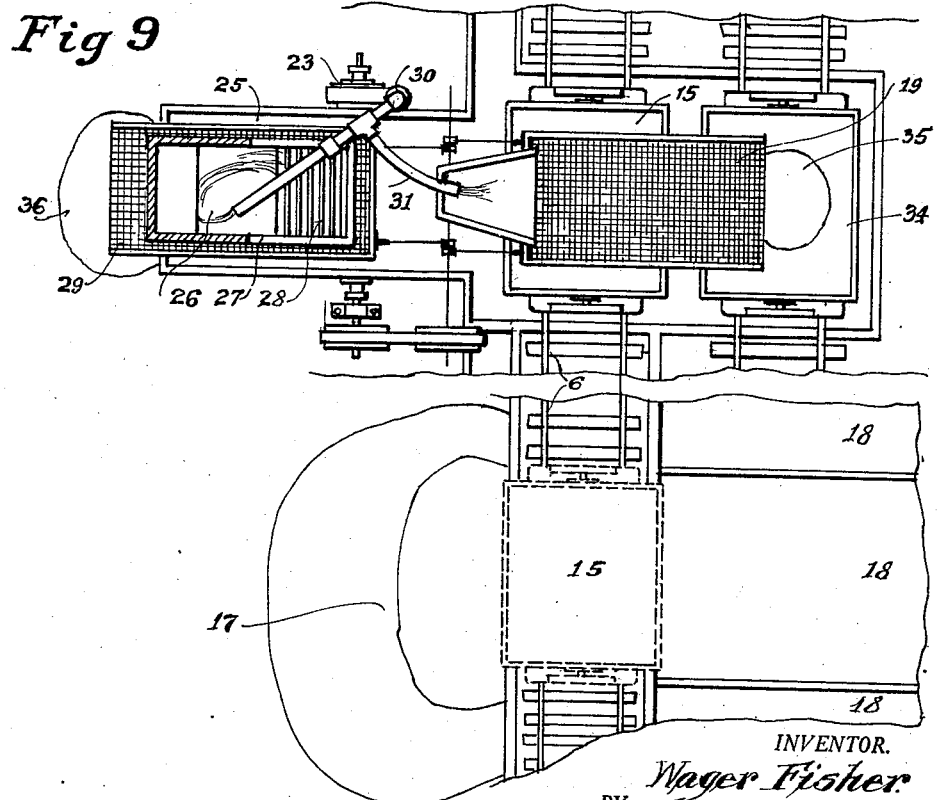
Figure 9 is a top plan view of the structure seen in Figure 8.

The pipe 30 carrying the discharge of the pump has a branch pipe 31 the end of which is adjustably elevated by means of the lever 32 and the chain 32' with initially sufficient elevation as shown at dotted position, Figure 8, that the entire circulating stream will return to the pump.

I then feed in the sand and binder materials into the hopper 33 being careful at the start of the process to feed a little excess binder material, or to feed sand having sufficient binder material in it that the binder fluid will be built up to a sufficient density to float the sand and thus avoid choking the pump with sand.

When the sand fluid has been brought up to the required degree of concentration, the branch pipe 31 may be lowered until a portion of the circulating stream will be drawn off constantly to the sand screen 19, and passing through said screen will be caught in the portable pools or cars 15 or as shown in Figures 10 and 11 will flow in channel 20 to pool 15'.

During this process of drawing off a portion of the circulating stream, sand and binder material may be continually added to the circulating stream and the process will be continuous until the point is reached where the constantly inflowing fresh water through valve 24 will have floated on the top of the heavier specific sand fluid to a sufficient depth to be drawn into the pump 23.

When this is about to occur, the operator preferably raises the lever 32 to permit the circulating stream 26 to build up again to the required degree of sand and binder concentration, after which the branch pipe 31 is again lowered and the sand fluid be permitted to flow again to the settlement pools.

Samples may be taken of the circulating stream on the branch discharge to determine the correctness of the product.

The valve 24 may be adjusted to regulate the inflow of fresh water and if all the speeds of the apparatus are properly adjusted, the periodic action of the circulating stream may be entirely eliminated. It is an advantage for the fresh water to flow on screen 29 through valve 24' as it helps to dissolve and wash the pebbles clean of any adherent binder material. The object of the coarse screen is merely to remove any larger pebbles or objects which would clog the action of the pump 23. The purpose of the finer sand screen is to size the sand and remove the smaller pebbles not removed by screen 29. In Figure 8 is shown a car 34 to catch the tailing 35 from screen 19, whereas in Figure 10 the tailing are shown accumulating in a pile 35' on the ground which must be removed from time to time.

As nearly all molding sands and binder material is lumpy unless specially prepared, I have provided the grating 28 in bottom of hopper 27 for the purpose of retaining the larger lumps which, if they are not dissolved by the action of the current, may be crushed by hand operation and the grating thus kept open.

Any lumps that fall on coarse screen 29 that are too large to pass through the screen 29 and are not disrupted by the active vibration of the screen, will roll off with the waste material to a pile 36 and the smaller undissolved lumps passing through screen 29 pass through the pump where the centrifugal action is so violent and the rubbing action of the grains of sand one against another is also so violent as to disintegrate lumps of binder material and binder material and sand to form a sand fluid in which substantially naked sand grains are floating in suspension in a subsequent true binder fluid.

The turbulence of the fluid accomplishes a uniform distribution of the particles of binder and grains of sand throughout the whole circulating mass.

To summarize:—

Figure 12:
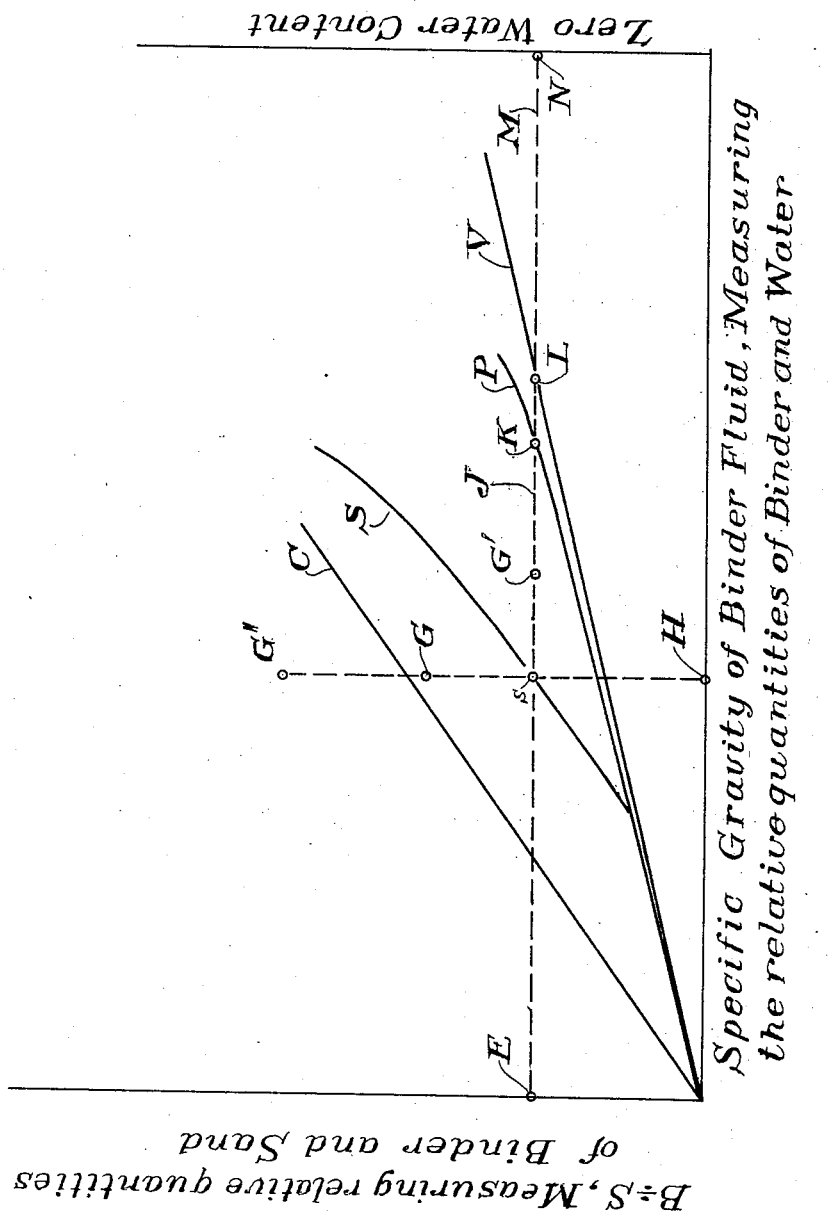

The existing physical relations taken advantage of in carrying out my invention may perhaps be more clearly understood from a consideration of Figure 12 which is a curve sheet such as could advantageously be used for controlling the manufacture of different grades of molding sand from raw materials of given characteristics. In practice the control curves vary with differences of sand and binder textures and differences in conditions during water elimination and the curves of the figure are hypothetical indications of the different existing phases.

The ordinants B÷S show the relation between the weight of binder to the weight of sand and the abscissæ specific gravity of binder fluid gives a measure of the relative amounts of binder and water present. The lines V, P, S, C and D are respectively, the void line, the plasticity line, the synthesis line, the cloud settlement line and the dry-sand line.

All sands in the phase below the void line are fairly firm because the spaces between the individual grains of sand are incompletely filled with binder fluid; all sand in the phase represented by points between the void and plasticity lines are plastic and non-fluid at low pressures. A settling sand fluid loses its fluidity and becomes plastic when gradual exfiltration of water brings the sand fluid to the conditions represented by a point on the plasticity line P and becomes firm when continued exfiltration of water brings conditions represented by a point at or below the void line V.

The region below the void line represents sands that are firm by reason of an incomplete filling of the space between the individual grains of sand. Sands represented by points beneath the void line have coated grains that touch one another with void spaces that are only partially filled with binder material and water. It will be seen that pure water is represented by the origin point and that dry molding sand is represented by points along the line D.

The synthesis line S curves diagonally upward from the plasticity and void lines and the synthesis or overload range is represented by the space between the synthesis line and the plasticity line.

Sand fluids having conditions of concentration represented by points between the plasticity and synthesis lines are within the synthesis or overloaded range and when made quiescent will maintain the initial relative arrangement between the grains of sand and particles of binder throughout the period of gradual elimination of water from the sand, substantially the only relative movement between the grains of sand and particles of binder being a drawing together of the grains and particles as the water escapes.

The cloud settlement or load line C is shown above the synthesis line in the curve sheet, but in some instances probably coincides with the synthesis line at the higher specific gravities of the binder solution.

I have called the sand fluids having conditions of concentration represented by points in the region between the cloud settlement line and the synthesis line loaded or cloud settlement sand fluids in that the settlement of such sand fluids takes place without any substantial segregation between the different sizes of the sand grains, settlement beginning as a cloud and ending as a cloud and the product remaining uniform with respect to size of grain even though there may have been initial wide variation in the sizes of the different grains of sand before settlement began. In these sands the concentration of the sand grains is such as to permit settling of the sand grains through the particles of binder but to prevent any material passage of the grains past one another under such condition as normally exist when the sand fluid is made quiescent.

Substantially the same arrangement of sand grains maintains from the time of quiescence until the sand fluid has completely settled and dried. The arrangement of the particles of binder however is that existent when the sand has settled to its synthesis range,—not that existent when the fluid was first made quiescent.

The region above the cloud settlement line C represents sand fluids that are underloaded with sand and the underloaded sand fluids when made quiescent normally settle with more or less segregation of the sand grains according to size.

I have found in practice that settlement of an underloaded sand fluid is a progressive settlement apparently little affected by the presence of the loaded zone between the cloud settlement line and the synthesis line, there being often considerable segregation of the different sizes of sand grains during settlement, the larger grains coming down faster than the smaller grains and the lower layers of the settled product containing grains of sand that are progressively larger than the upper layers of the settled product.

Settlement of a sand fluid from any point above the synthesis line, particularly if the sand fluid is within the cloud settlement range or loaded with sand when settlement begins, produces a settled product having binder-to-sand ratio corresponding to the synthesis point and when settling either underloaded or loaded sand fluids I control the binder-to-sand ratio in the finished product by suitable adjustment of the synthesis point, raising the point of synthesis to increase the binder content in the product or lowering it to decrease the binder content in the product and the control of the synthesis point is an important feature of my present invention.

I find it frequently desirable to start with a molding sand that is barely within the loaded range, such as can be represented for example by a point a little below the cloud settlement line on the figure.

Such a sand fluid has relatively high fluidity because the water is as high as is consistent with a fairly stable arrangement of sand grains, and in that any rapid settlement is prevented by the spacing of the sand grains being sufficiently close to prevent relative movement of the large and small grains past one another.

With this condition screening and initial mixing is more easy than if the sand fluid were such as to be represented by a point within the synthesis range.

To make clear the peculiar advantages of the different ways of operating my process—

If a binder content is desired in the product such as may be represented by the point E on the vertical ordinant, I may start with a sand fluid represened by the point G just below the load line or start with a sand fluid represented by the point G' already well within the overload range.

In the first case preparatory mixing and screening operations will usually be more easy, and as soon as the sand fluid is made quiescent the sand begins to settle as a cloud without any material relative movement between its large and small grains other than a drawing together of the grains as the binder fluid escapes from between them, the settling mass of sand leaving a supernatant binder fluid above the settling sand having a specific gravity represented by the abscissa H.

When the concentration of the settling sand grains reaches the synthesis point $s$ the grains of sand have reached a relative spacing such as to definitely imprison all of the binder fluid then entrained between the spaced grains of sand and the stability of arrangement in the settling mass now extending to the particles of binder and the settling fluid has attained its final and desired value E of B÷S, substantially pure water escaping during further settlement, substantially all of the binder remaining entrained between the grains of sand and continued settlement taking place along the horizontal line J with exfiltration of water and consequent reduction in volume until at the point K on the plasticity line the water has been so far eliminated from the intergranular binder fluid that the wet mass of sand and binder loses its fluidity, reaching plasticity.

Water will continue to be eliminated by exfiltration and evaporation, the sand becoming less and less plastic until approximately at the point L on the void line the molding sand is no longer plastic but firm. Continued elimination of water will be very gradual and take place along the horizontal line M until at point N on the dry sand line the binder contains no water whatever.

In this method of operating it is requisite to maintain conditions that will definitely determine the position of the synthesis point $s$ and any variation in specific gravity of the binder fluid, in the texture of the sand used, in the temperature of the sand fluid at quiescence, or in conditions such as depth of settlement affecting the way in which the water may be eliminated, will all have a more or less material variant effect upon the synthesis point $s$ and, therefore, upon the binder content in the ultimate product. The two conditions usually used for adjusting the synthesis point are specific gravity of the binder fluid and size of the sand grains.

It will be observed that the settling sand passes through conditions represented by the point G' in the middle of the synthesis range and the principal advantage in starting at the upper point is one incident to greater ease in obtaining homogeneous mixing and greater ease in screening.

In many cases the sand fluid represented by the point G' in the middle of the synthesis range is one that may be screened and homogeneously mixed without great difficulty and in this case it is quite advantageous to start at the point G' within the synthesis range.

If the sand is one that may be represented by the point G' within the synthesis range variations in specific gravity of the binder fluid and of other factors affecting the synthesis point may be considerably varied without exerting any effect whatever upon the binder content E in the product the control being merely that of maintaining the binder-to-sand ratio in the sand fluid the same as that desired in the product.

It will be observed that E, the binder to sand ratio of synthesis of the molding sand, is in each case the ultimate binder to sand ratio in the product.

I have found it sometimes desirable to start settlement from a point G" above the cloud settlement line. In this event settlement is progressive to the synthesis point $s$ which is variant for grains of different size the larger grains with normal settling conditions coming down first.

After the larger grains settle to their synthesis range I may pour off the supernatant sand fluid, comprising the smaller grains of sand floating in binder fluid for use in manufacturing a very fine and uniform grade of molding sand, or binder material.

If the desired binder content in this latter molding sand is to have the same value E as that of the larger grained sand settling first, there must be a suitable dilution of the poured off sand fluid.

While I have treated the synthesis range as that existing between the synthesis and void lines, it will be understood that it is more properly all of the range below the synthesis line throughout which substantial homogeneous mixing may be obtained; and in some cases the range therefore overlaps the plasticity range.

It will be further evident that by my invention I expand the binder by water to a fluid having a binder content in excess of void space between the sand grains, and then insert the sand within it so as to have a content having larger interstitial spacing than the sand voids and filled with binder.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. In the manufacture of molding sand the method which consists in forming a mixture of sand in binder fluid having a sand content suited to form a cloud settlement range of sand, in making the percentage of binder in the fluid high enough so as to form a synthesis range for settlement underlying the sand in the cloud settlement range and in settling the sand through both ranges.

2. In manufacturing molding sand, the method which consists in making and settling a sand fluid having a synthesis point, regulating the synthesis point of the sand fluid to the desired binder content in the product and settling the sand from a sand concentration as low as that at the synthesis point.

3. In manufacturing molding sand, the method which consists in making and settling a sand fluid having a synthesis range and a cloud settlement range, and before settling regulating the amount of sand so that the sand fluid is within its cloud settlement range and in regulating the relative quantities of binder material and water to determine the binder content in the product.

4. In the manufacture of molding sand the method of controlling the relative sand and ultimate binder content, which consists in mixing binder fluid and sand in such proportions as to have a cloud settlement range and a synthesis range, in settling the sand through both ranges and in varying the proportion of binder trapped in the ultimate product by selection of the size of sand grains.

5. In the manufacture of molding sand, the method which consists in making an overloaded sand fluid, delivering the output of sand fluid to a relatively small receptacle, and in discharging the small receptacle at periodic intervals into a larger receptacle at intervals of time sufficiently close together to prevent loss of fluidity in the accumulating settling sand fluid within the larger receptacle.

6. The method of manufacturing molding sands of different grain finenesses which consists in making an underloaded sand fluid of which the sand grains are of variant sizes, in settling the fluid to the synthesis range of the larger grains, in removing the supernatant sand fluid from the settling fluid within the synthesis range, and in using the removed supernatant sand fluid which contains the smaller grains for the manufacture of a finer grained molding sand.

7. In manufacturing molding sand by settling a turbulent sand fluid having a range of synthesis, the method which consists in regulating the binder-to-sand ratio in the product by adjustment of the specific gravity of the sand fluid.

8. In the manufacture of molding sand by settling a turbulent sand fluid that is within its range of synthesis, while still turbulent, the method which consists in determining the binder-to-sand ratio in the product by regulating the specific gravity of the sand fluid with respect to the specific gravity of the binder fluid.

9. In manufacturing molding sand by settling from above its synthesis point a sand fluid having a range of synthesis, the method which consists in determining the binder-to-sand ratio in the product by the coarseness or fineness of the sand grains selected.

10. In manufacturing molding sand by settling from above its synthesis point a sand fluid having a range of synthesis, the method which consists in determining the binder-to-sand ratio in the product by increasing the depth of settling to increase the binder content and reducing the depth of settling to reduce the binder content.

11. The process of forming molding sand in a binder solution, which consists in maintaining the binder solution in turbulence while adding sufficient sand for the sand to entrain substantially all the binder in the interstitial spaces of the sand, as the sand-binder mixture reduces in total volume during the settlement, and reducing the water volume within the falling sand and binder.

12. The process of manufacturing molding sand which consists in forming a mixture of binder and sand in water sufficiently concentrated in both so that mass settlement will take place as distinguished from settlement of sand through a binder solution whereby no substantial surplus binder is left from the settlement and in transmitting the mixture to a distance for extrusion of water to be effected during quiescence.

13. The process of preparing molding sand which consists in selecting a binder fluid of predetermined specific gravity high enough and a quantity of sand sufficient to bring the mixture within the synthesis range and settling by mass action.

14. The method of forming molding sand, which consists in mixing the desired proportions of the constituents, binder and sand in water and in settling the constituents altogether, the finer particles filling in the spaces between the larger particles as the settling takes place to effectively carry all of the binder with the settling sand and leave clear water above the settling mass.

WAGER FISHER.